United States Patent
Mogard et al.

[11] Patent Number: 6,003,712
[45] Date of Patent: *Dec. 21, 1999

[54] ONE-PIECE MOLDED FLIP CAP CLOSURE

[75] Inventors: Jens Mogard, Buffalo Grove, Ill.; Karl-Erik Lundh; Gote Elof Rickardsson, both of Gislaved, Sweden

[73] Assignee: Tetra Laval Holdings & Finance, S.A., Switzerland

[*] Notice: This patent is subject to a terminal disclaimer.

[21] Appl. No.: 08/958,996

[22] Filed: Oct. 28, 1997

Related U.S. Application Data

[60] Provisional application No. 60/030,312, Nov. 1, 1996.

[51] Int. Cl.⁶ .............................. B65D 5/74; B65D 41/50
[52] U.S. Cl. ......................... 220/257; 220/258; 220/266; 215/235; 215/250; 229/125.15; 222/541.5; 222/541.9; 222/556
[58] Field of Search ..................................... 220/258–259, 220/257, 269, 270, 266, 335, 339, 831, 832, 837–839, 847; 215/235, 237, 250, 253, 254, 255, 257, 258, 303, 305, 306, 341, 349; 229/125.04, 125.05, 125.14, 125.15, 125.42, 102, 214; 222/541.1, 541.5, 541.6, 541.9, 556, 562, 567, 569, 570, 498, 153.14

[56] References Cited

U.S. PATENT DOCUMENTS

| | | |
|---|---|---|
| 1,481,217 | 1/1924 | Maloy . |
| 2,808,972 | 10/1957 | Flugge et al. . |
| 2,901,800 | 9/1959 | Koehl . |
| 2,986,309 | 5/1961 | Larson . |
| 3,199,309 | 8/1965 | Brubaker . |
| 3,412,919 | 11/1968 | Cain . |
| 3,608,771 | 9/1971 | Monroe et al. . |
| 3,712,519 | 1/1973 | Collie . |
| 3,733,015 | 5/1973 | Marques . |
| 3,998,354 | 12/1976 | Song et al. . |
| 4,022,357 | 5/1977 | Dwinell . |
| 4,124,134 | 11/1978 | Montgomery . |
| 4,483,464 | 11/1984 | Nomura . |

(List continued on next page.)

FOREIGN PATENT DOCUMENTS

| | | |
|---|---|---|
| 0435279 | 3/1991 | European Pat. Off. . |
| 548010 | 6/1993 | European Pat. Off. .......... 229/125.15 |
| 2-45364 | 2/1990 | Japan ................................. 222/541.9 |
| 94/14696 | 7/1994 | WIPO ................................. 222/541.6 |

*Primary Examiner*—Stephen K. Cronin
*Assistant Examiner*—Nathan Newhouse
*Attorney, Agent, or Firm*—Welsh & Katz, Ltd.

[57] ABSTRACT

A closure for a container and a method of producing the same is set forth. The closure is a single integrally-molded spout, cap, hinge assembly joining the spout and the cap, and a tamper evident structure. The closure may also have a membrane and pull-ring, also integrally molded as one piece. The cap may have at least one prop for preventing interference from the cap with the pouring of the contents of the container. Additionally, the spout may have a step for assisting in the prevention of interference from the cap during pouring, and for providing a predetermined sound every time that the cap is opened. Still further, the closure may have an orienting peg for properly orienting the closure on a container.

2 Claims, 9 Drawing Sheets

U.S. PATENT DOCUMENTS

| | | |
|---|---|---|
| 4,669,640 | 6/1987 | Ando et al. . |
| 4,730,771 | 3/1988 | Walton . |
| 4,782,996 | 11/1988 | Spahni, Jr. . |
| 4,830,273 | 5/1989 | Kalberer . |
| 4,909,434 | 3/1990 | Jones et al. . |
| 4,925,034 | 5/1990 | Robichaud et al. . |
| 4,964,562 | 10/1990 | Gordon . |
| 4,986,465 | 1/1991 | Jacobsson et al. . |
| 4,990,200 | 2/1991 | Heinz . |
| 5,012,959 | 5/1991 | Gordon . |
| 5,065,938 | 11/1991 | Anderson ........................ 229/125.15 X |
| 5,069,385 | 12/1991 | Färber . |
| 5,076,493 | 12/1991 | Anderson . |
| 5,101,999 | 4/1992 | Robichaud et al. . |
| 5,108,029 | 4/1992 | Abrams et al. . |
| 5,125,886 | 6/1992 | Dirksing . |
| 5,152,438 | 10/1992 | Gordon et al. . |
| 5,156,295 | 10/1992 | Gordon et al. . |
| 5,199,635 | 4/1993 | Abrams et al. . |
| 5,203,470 | 4/1993 | Brown ............................ 229/125.15 X |
| 5,244,520 | 9/1993 | Gordon et al. . |
| 5,271,536 | 12/1993 | Wilson .................................... 222/498 |
| 5,297,696 | 3/1994 | Bernstein et al. . |
| 5,322,176 | 6/1994 | Dubach . |
| 5,366,114 | 11/1994 | Bernstein et al. . |
| 5,601,669 | 2/1997 | Gordon et al. . |
| 5,636,785 | 6/1997 | Kalberer . |
| 5,657,889 | 8/1997 | Guglielmini . |
| 5,657,891 | 8/1997 | Bilani et al. . |
| 5,735,418 | 4/1998 | Erb et al. ............................... 215/237 |
| 5,735,426 | 4/1998 | Babcock et al. ........................ 220/258 |
| 5,799,840 | 9/1998 | Mogard ............... 222/556 X |

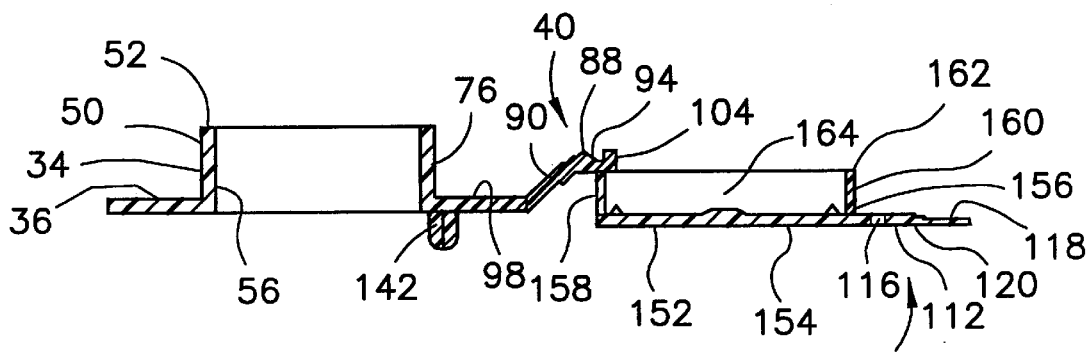
FIG. 17
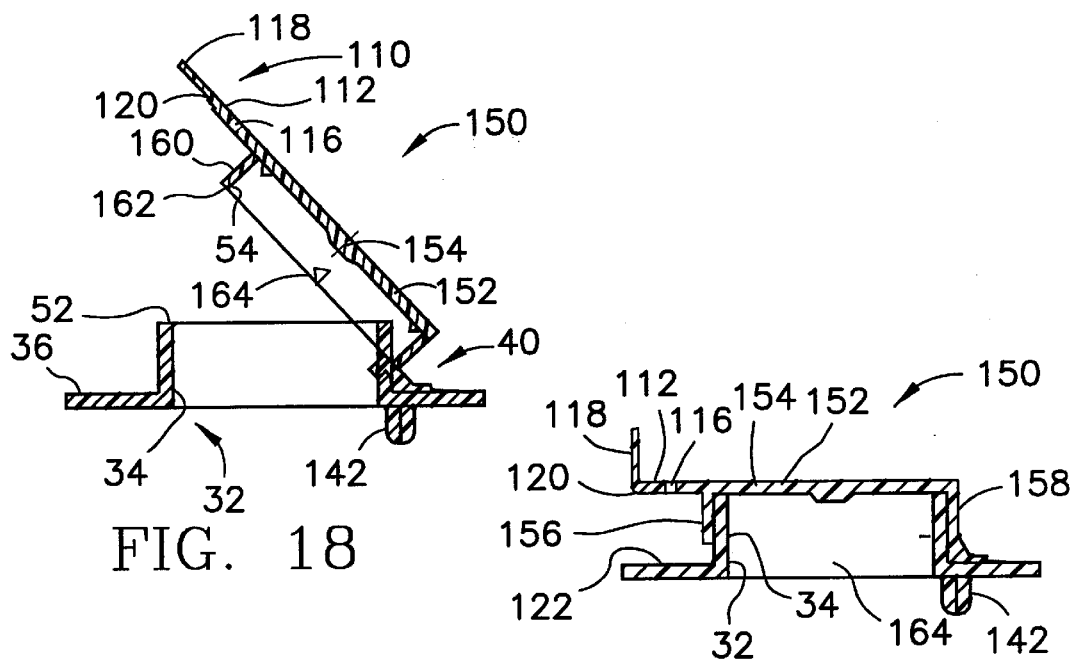
FIG. 18
FIG. 19
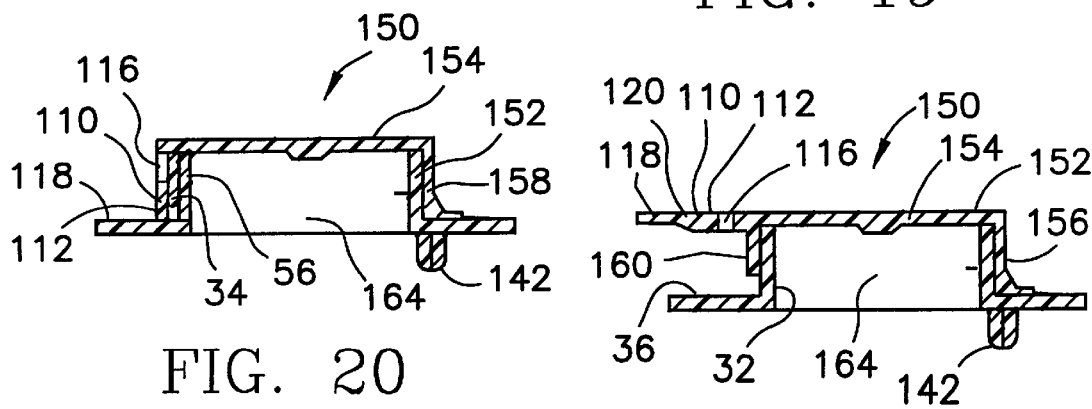
FIG. 20
FIG. 21

ONE-PIECE MOLDED FLIP CAP CLOSURE

CROSS REFERENCES TO RELATED APPLICATIONS

This application is a continuation of U.S. Provisional Patent Application No. 60/030,312, filed on Nov. 1, 1996, which is hereby incorporated by reference.

STATEMENT REGARDING FEDERALLY SPONSORED RESEARCH OR DEVELOPMENT

Not Applicable

BACKGROUND OF THE INVENTION

1. Field of the Invention

The present invention relates to closures for food packaging. Specifically, the present invention relates to a one-piece flip-cap closure for use in food packaging having a tamper-evident structure thereon.

2. Description of the Related Art

Resealable closures are now commonly employed on, for example, gable-top containers. The closures are generally snap-type caps or screw-type caps which are removable from and resealable over an opening of a corresponding spout. Such closures desirably include tamper-evident features to enable a retailer or consumer to determine whether the closure has been opened before.

Conventional closures have certain limitations. For one thing, the closures themselves can be quite costly to produce, frequently being formed from two or more separate parts formed in two or more separate molds using two or more separate injection molding processes and two or more different materials. Even where a single mold is used, costly and complex laterally moving mold elements which move perpendicular to the primary mold closing direction may be required.

Another problem with many closures is the requirement for difficult and expensive assembly operations for finishing the closures and installing them on containers. These operations can require expensive tooling. Even the parts of a simple threaded cap and spout closure for installation through a panel of a gable top container must be separately molded, positioned in relation to each other, assembled, and then held in place in some fashion (such as by installing a tamper-evident joint at the same time) as the cap does not loosen and potentially fall off. These operations are conventionally carried out by the manufacturer of the closures, which are shipped in bulk to the food packager. The food packager must then retrieve each assembled closure from its bulk container, orient it in a packaging machine, and secure the closure to the package as it is assembled and (usually) before it is filled.

A closure with a snap-on cap joined to the spout by an integral hinge is somewhat easier to assemble, in that the cap and spout, and in some instances the tamper-evident structure, are already located in preestablished positions by molding them as one piece. But snap-on closures often require complex assembly and joining operations to initially close them and place their tamper-evident structure in its operative position. For mass-production closures, complex machinery is required to carry out the assembly operation. Too often, the closure must be assembled in one or more steps, closed in one or more steps, and installed on the container in one or more steps. The entire manufacturing process can thus include many steps, and many duplicate steps (such as multiple heat sealing operations conducted on different machinery at different times).

The closure assembly must be inserted cleanly through a relatively small aperture in the container when the closure is installed. Commonly, the spout, cap, tamper-evident structure, and other closure elements are inserted through an aperture slightly greater in diameter than the spout, from the inside of the container. If the parts of the closure are not tied securely together and properly located during assembly, one or more appendages of the closure can be dislocated. At a minimum this can result in rejected containers. Worse, the automated mechanism for assembling closures or containers can jam, necessitating a shut-down to correct the problem.

Closures are known which have an impervious membrane or web closing the spout before use and a tear ring located within the spout. In many instances, the tear ring is recessed in the spout, and can be grasped only by inserting a finger into it and pulling it out of the spout to tear and remove the membrane or web and open the spout for use. One difficulty with many such tear rings is that a person with large fingers, or a person using one of his or her larger fingers or a thumb, or a person lacking in dexterity, has difficulty inserting a finger in the recessed ring. The inaccessible edge of the recessed ring cannot be manipulated. The ring is thus difficult to lift out of place so it can be grasped more firmly.

If the entire ring is simply elevated above the mouth of the spout in the same orientation (usually, parallel to the membrane), space must be left under the entire cap to accommodate the elevated ring or tab, thus providing a high-profile closure which projects a substantial distance above the panel in which the closure is mounted. A high profile closure is undesirable, as it can be unsightly and may require more material than a low-profile closure of the same diameter. A high-profile closure mounted on a diagonal top panel of a gable-top container also may project through the plane of the side panel of the container, interfering with packing operations.

Another issue regarding closures is the desirability of forming a closure from polyethylene, which can be heat-sealed or ultrasonically sealed directly to a polyethylene coated paperboard panel or a polyethylene bottle, as opposed to forming the closure from another plastic which must be glued to polyethylene. Gluing is a less desirable and less sanitary assembly method than heat or ultrasonic sealing, in general.

While polyethylene closures are easily installed on polyethylene-coated paperboard and other surfaces by heat or ultrasonic welding, polyethylene has other characteristics which must be dealt with when designing a closure. For example, polyethylene, unlike polypropylene and other plastics, readily inelastically deforms or relaxes during storage, and thus has little springiness or "memory" of its configuration as molded.

For example, assume that a cap, spout, and integral hinge assembly is molded in an open configuration with the inverted cap beside the upright spout and the hinge straight, then the hinge is folded in a "U" shape to position the cap upright above the spout, and the cap is pushed down on the spout. Next, assume the closure is stored for a time, then installed on a container, which is filled, closed, transported, stored for another time, then finally placed in the hands of a consumer.

If the closure is made of polypropylene, when the consumer finally opens the closure, the hinge will be springy or have a "memory" of being open when it was originally molded. The cap will thus spring out of the way of the spout, and not block or be soiled by a stream of fluid contents poured from the spout of the container.

If, however, the closure is made in the same way of polyethylene, the plastic will have relaxed during storage and the cap will not spring out of the way of the spout to the desired degree when the closure is opened. This problem requires the consumer to make a special effort to hold the cap out of the way when dispensing the contents of the container, or to risk soiling the cap and thus providing an unsanitary or unsightly closure.

Accordingly, the inventors have recognized that a need remains within the industry for an improved closure which assists in overcoming the disadvantages experienced in the past and discussed above.

BRIEF SUMMARY OF THE INVENTION

A closure for a container is set forth which comprises an integrally-molded spout, a cap, a hinge or other link joining the spout and the cap, and tamper-evident structure joining the spout and the cap. The tamper-evident structure includes a first portion secured to the cap (alternatively, to the spout) by a first breakable joint and a second portion secured to the first portion by a second breakable joint. The second portion is movable toward the spout (alternatively, toward the cap) as molded, but can be positioned and attached at least substantially in direct contact with the spout (alternatively, with the cap) while the cap is sealing the spout, in the course of assembling and securing the tamper-evident structure.

It is a primary object of the present invention to provide a closure having a spout, cap and tamper-evident structure formed as a single integral piece.

It is an additional object of the present invention to provide a closure having a prop for preventing interference from the cap during pouring of the contents from the spout.

It is an additional object of the present invention to provide a closure having an orienting pin integrally formed with the closure.

It is an additional object to provide a closure having a pull ring oriented for facilitated removal of a membrane attached thereto.

Having briefly described this invention, the above and further objects, features and advantages thereof will be recognized by those skilled in the pertinent art from the following detailed description of the invention when taken in conjunction with the accompanying drawings.

BRIEF DESCRIPTION OF THE SEVERAL VIEWS OF THE DRAWINGS

Several features of the present invention are further described in connection with the accompanying drawings in which:

There is illustrated in FIG. 1 a top perspective view of a preferred embodiment of a closure of the present invention prior to folding closed;

Figure 1:
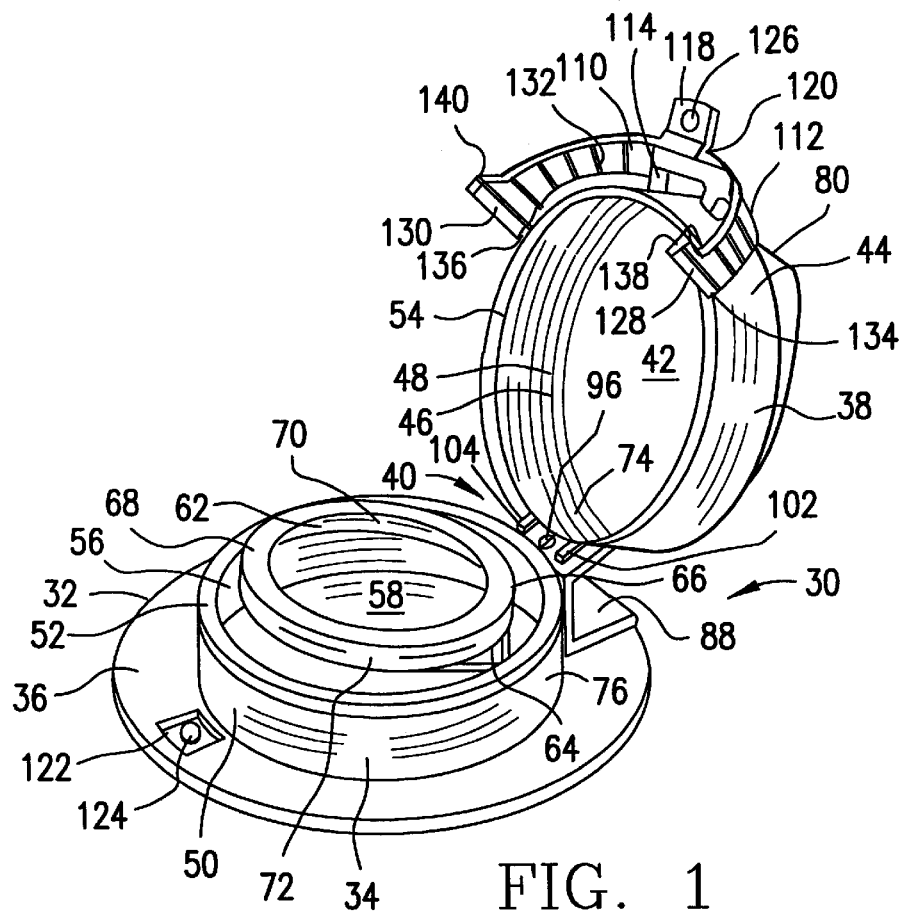
Figure 2:
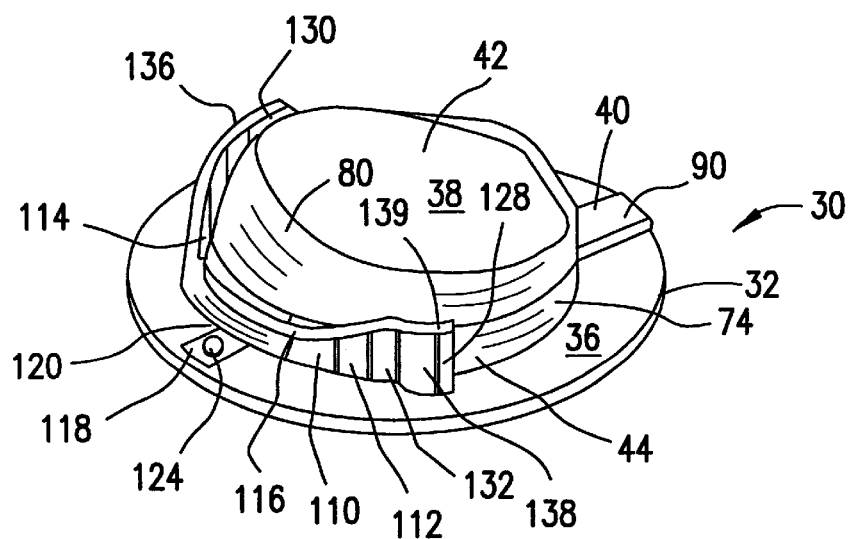
Figure 3:
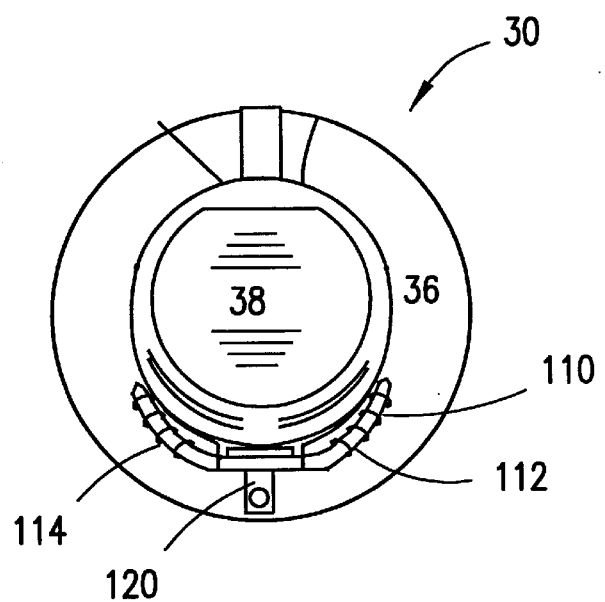
Figure 4:
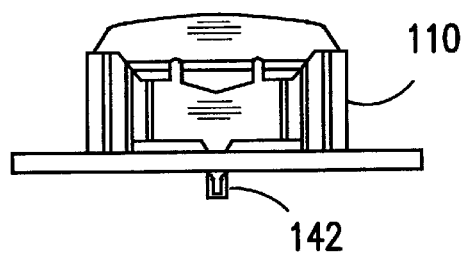
Figure 5:
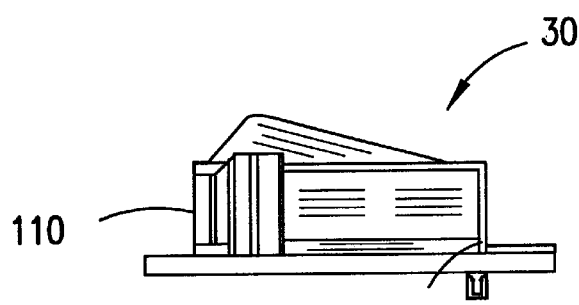
Figure 6:
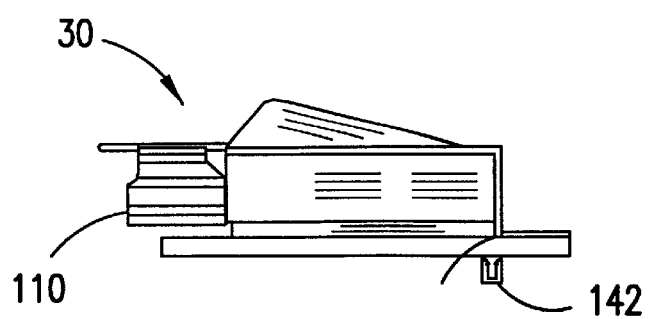
Figure 7:
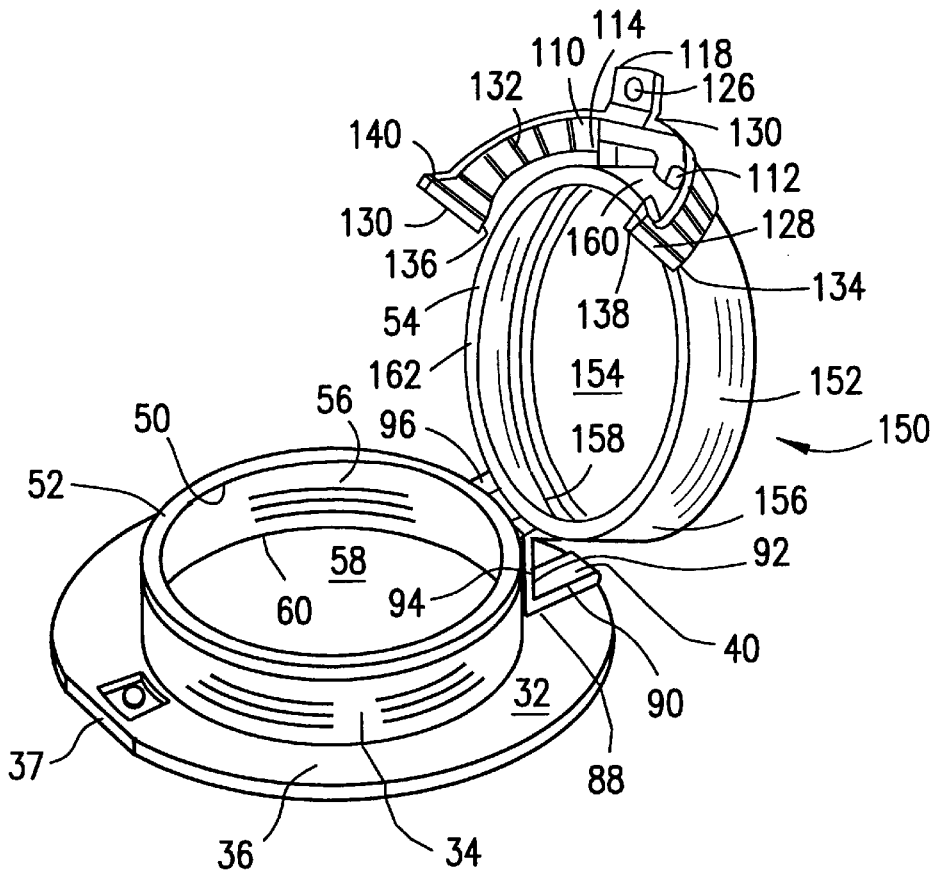
Figure 8:
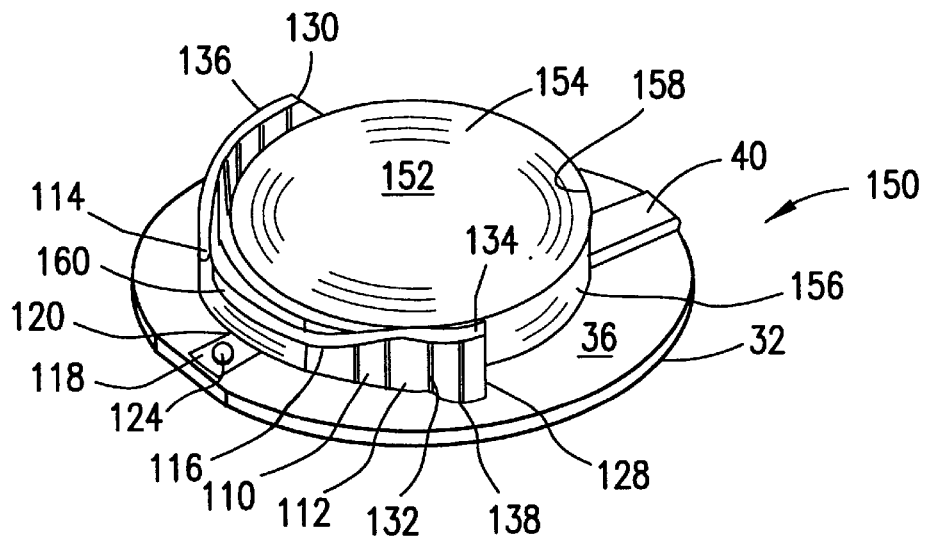
Figure 9:
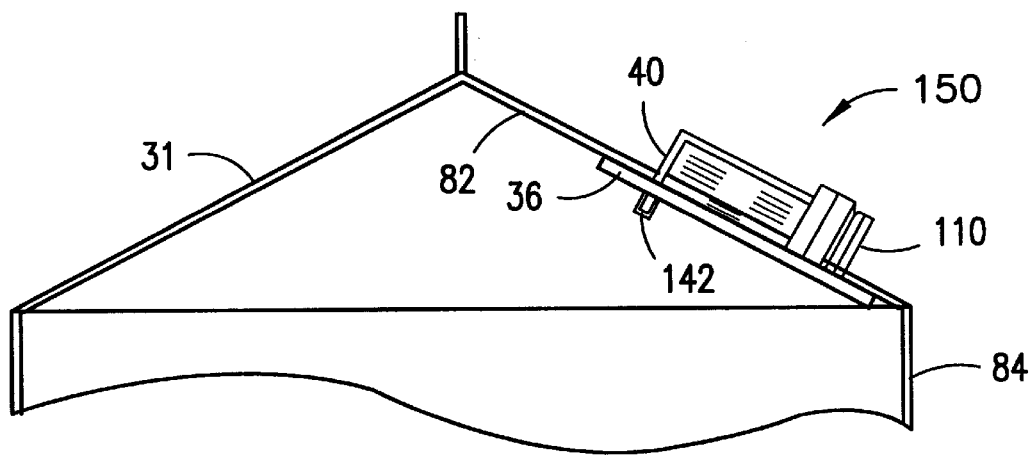
Figure 10:
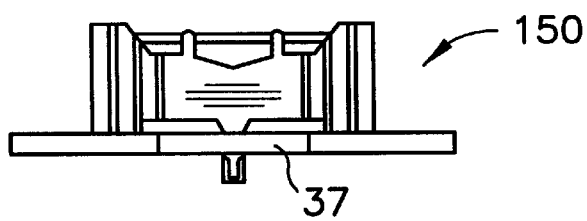
Figure 11:
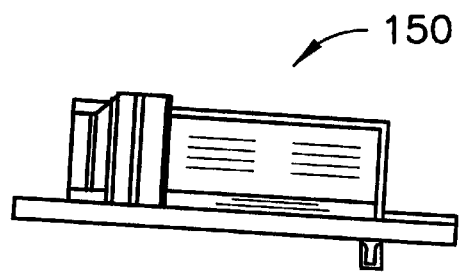
Figure 12:
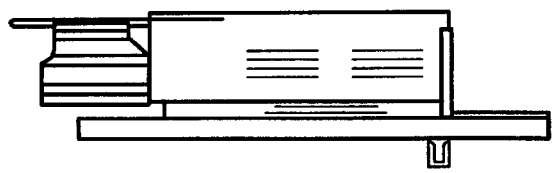
Figure 13:
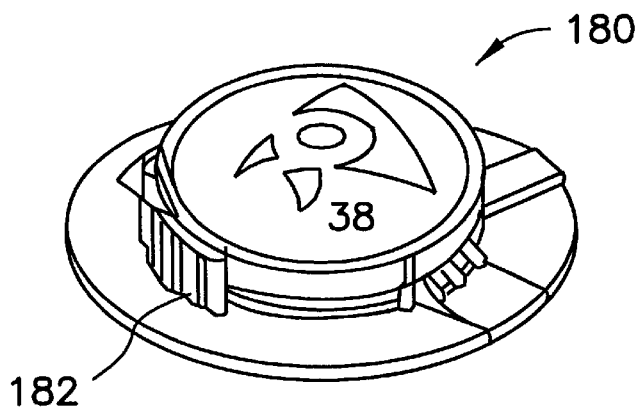
Figure 14:
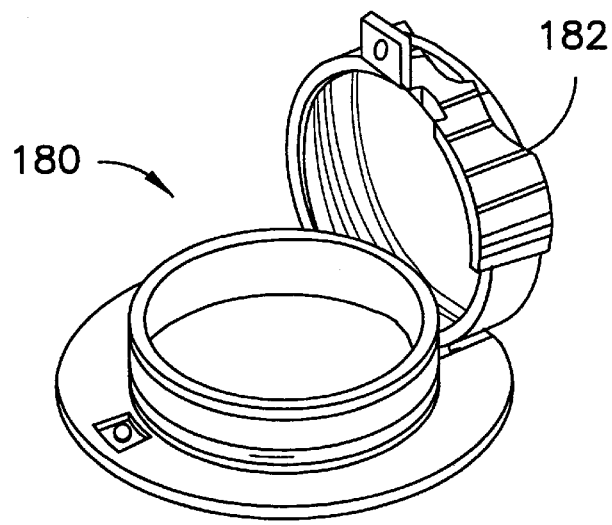
Figure 15:
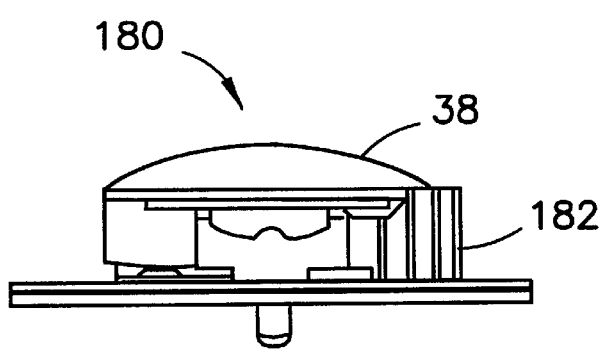
Figure 16:
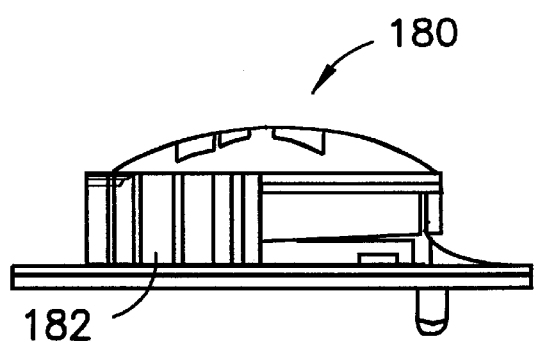
Figure 22:
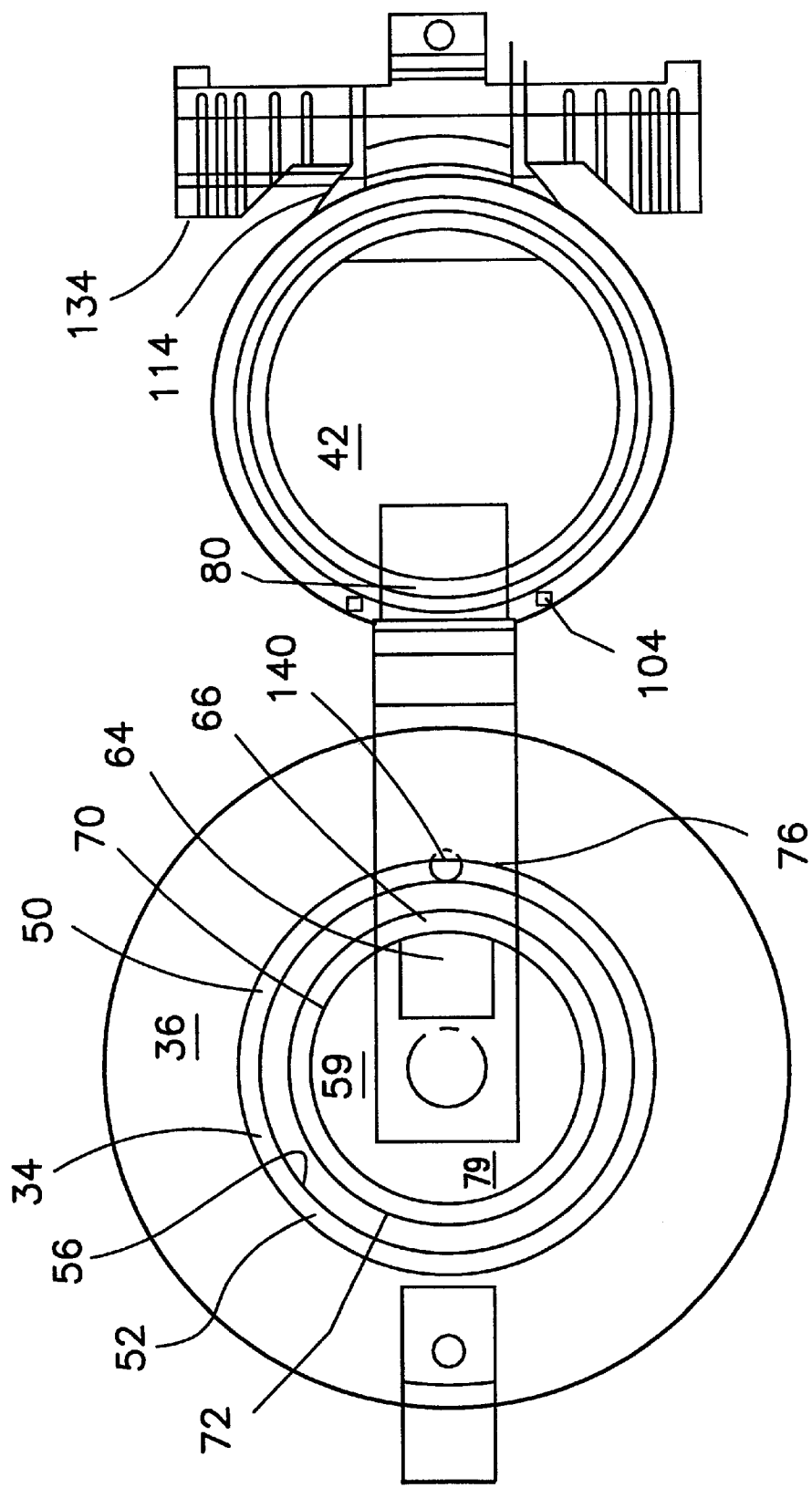
Figure 23:
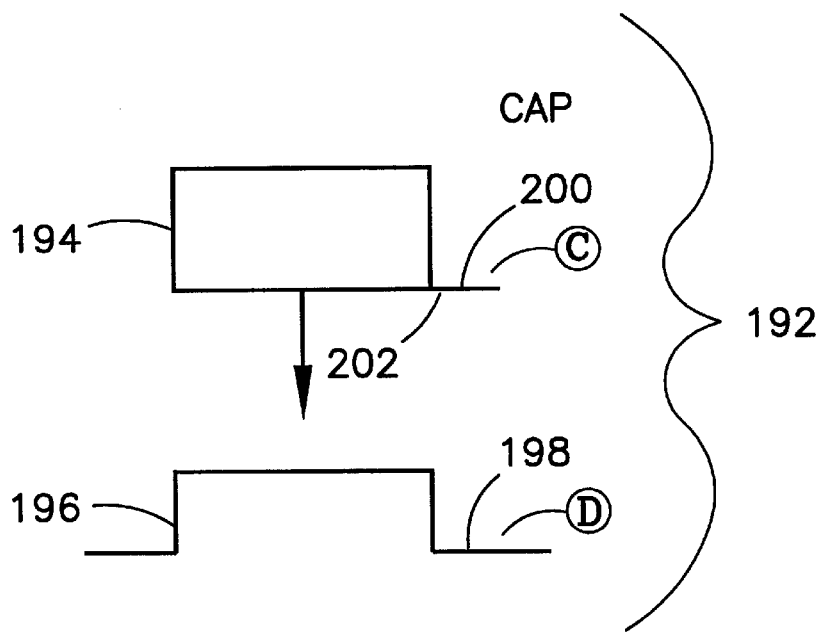
Figure 24:
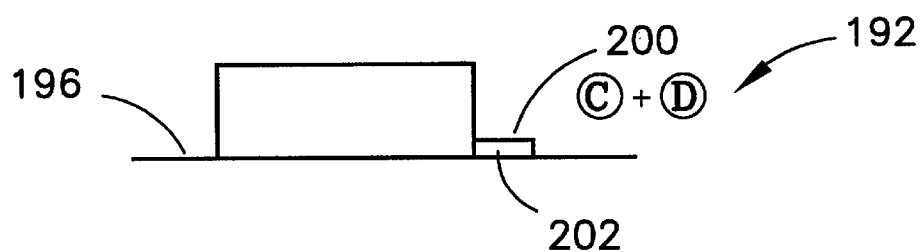
Figure 25:
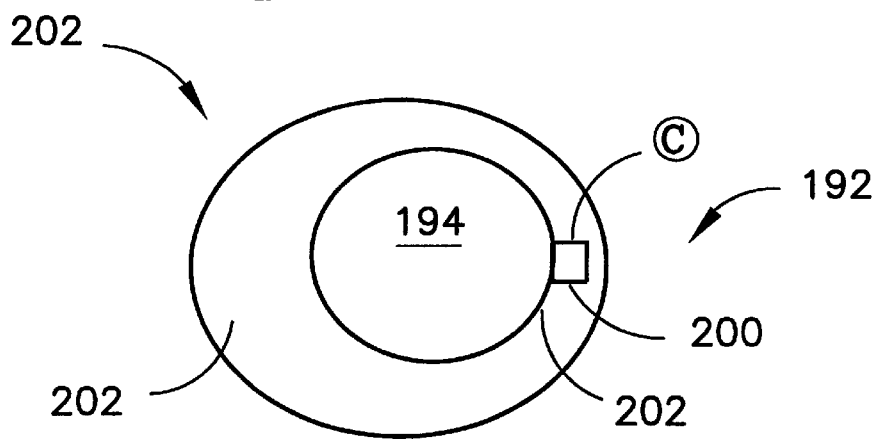
Figure 26:
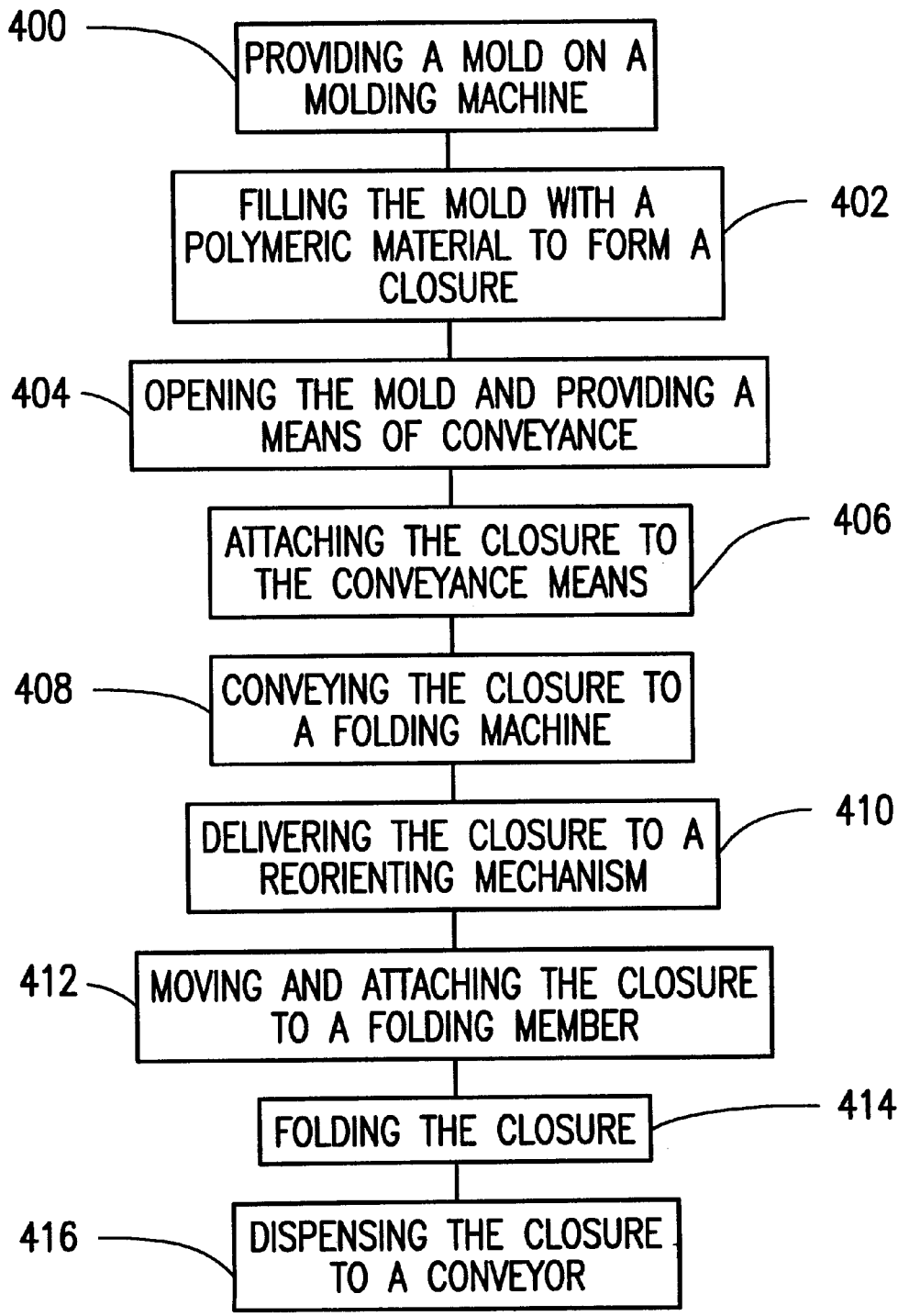

There is illustrated in FIG. 2 a top perspective view of a preferred embodiment of a closure of the present invention in the sealed or closed position;

There is illustrated in FIG. 3 a top plan view of the closure of FIG. 1;

There is illustrated in FIG. 4 a front perspective view of the closure of FIG. 1;

There is illustrated in FIG. 5 a side view of the closure of FIG. 1 sealed;

There is illustrated in FIG. 6 a side view of the closure of FIG. 1 with the tamper evident structure open;

There is illustrated in FIG. 7 a top perspective view of an alternative embodiment of a closure of the present invention prior to folding closed;

There is illustrated in FIG. 8 a top perspective view of the closure of FIG. 7 in the sealed or closed position;

There is illustrated in FIG. 9 a side perspective of the closure of FIG. 7 attached to a gable-top carton;

There is illustrated in FIG. 10 a front perspective view of the closure of FIG. 7;

There is illustrated in FIG. 11 a side view of the closure of FIG. 7 sealed;

There is illustrated in FIG. 12 a side view of the closure of FIG. 7 with the tamper evident structure open;

There is illustrated in FIG. 13 a top perspective view of an alternative embodiment of a closure of the present invention;

There is illustrated in FIG. 14 a top perspective view of the closure of FIG. 13 prior to folding closed;

There is illustrated in FIG. 15 a front perspective view of the closure of FIG. 13;

There is illustrated in FIG. 16 a side view of the closure of FIG. 13 sealed;

There is illustrated in FIG. 17 a side view of a closure of present invention as formed in a mold;

There is illustrated in FIG. 18 a side view of the closure of FIG. 17 after removal of the closure from the mold and during the folding process;

There is illustrated in FIG. 19 a side view of the closure of FIG. 17 fully folded over for distribution;

There is illustrated in FIG. 20 a side view of the closure of FIG. 17 with the tamper-evident structure partially folded;

There is illustrated in FIG. 21 a side view of the closure of FIG. 17 with the tamper-evident structure fully folded;

There is illustrated in FIG. 22 a bottom plan view of the closure of FIG. 17;

There is illustrated in FIGS. 23–25 an alternative embodiment of the present invention;

There is illustrated in FIG. 26 a flow diagram of the method of producing the closure of the present invention.

DETAILED DESCRIPTION OF THE INVENTION

There is illustrated in FIGS. 1–6 an embodiment of a re-sealable closure 30 that may be utilized, for example, in conjunction with a gable-top container 31 (see FIG. 9) having a body formed from a paperboard-based substrate that is disposed between outer layers of a thermoplastic polymer material. The closure may also be used with a non-paperboard based polyethylene container, or with other types of containers generally.

The closure 30 is formed as a single, integrally molded piece and generally includes a spout 32 having a stem 34 which is tubular in shape and projects upward from an annular base flange 36 extending about the periphery of the lower end of the stem 34. The base flange 36 has a generally circular shape except for a flat portion 37. The flat portion 37 is optional and assists in orienting the closure 30 during placement on a container 31. The spout 32 is joined with a cap 38 by an integral hinge assembly 40.

The cap 38 resealably engages the stem 34 of the spout 32. In the particular embodiment illustrated here, the cap 38 includes an upper lid 42 surrounded by a downwardly projecting skirt 44. The upper lid 42 may have a beveled edge 43 as a transition between the upper lid 42 and the skirt 44. The skirt 44 and lid 42 cooperate to define a vaulted interior cavity which receives an upper portion of the stem 34 when the cap 38 is secured about the stem 34 to close the closure 30.

An annular recess 46 is formed about the interior of the cap 38 near the intersection of the skirt 44 and the lid 42. An interior surface of the skirt 44 includes an inner rib 48 extending about its interior. The lid 42 and the rib 48 cooperate to define the recess 46 between them.

The stem 34 includes an upper end 50 having an outwardly flared lip 52 extending about the exterior periphery of the stem 34. The lip 52 engages the recess 46 of the cap 38 when the closure 30 is in a closed position. The skirt 44 includes a beveled surface 54 at its mouth to enable the cap 38 to be easily guided over the lip 52. The lip 52 and rib 48 engage one another to seal the cap 38 over the stem 34. The stem 34 further includes an aperture 56 to enable the contents of the container 31 to be poured out when the cap 38 is removed.

Within the spout 32, an optional membrane 58 may be disposed over the aperture 56. The membrane 58 is a web integrally formed within the stem 34, in this embodiment. The intersection of the membrane 58 and the interior surface of the stem 34 defining the aperture 56 is weakened by the circular groove 60 defining that intersection.

The membrane 58 includes an integral pull ring 62, optionally formed at least approximately concentrically with the stem 34. The pull ring 62 is secured to the membrane 58 by a post 64 which is integral with the membrane 58. The pull ring 62 has a post side 66, a free side 68 approximately diametrically opposed to the post side 66, an inner surface 70, and an outer surface 72.

FIGS. 7–12 illustrate another embodiment 150 of the closure. One distinguishing feature of the closure 150 is the shape of its cap 152, which has a generally flat lid 154. The shape of the cap 152 affords a closure 150 having an extremely low height or profile. The height of the closure 150 can be the sum of the height of the lip 52 above the flange, plus the thickness of the lid 154, minus the thickness of the container wall through which the closure is inserted.

The generally cylindrical skirt 156 of the cap 152 is also modified to make the cap 52 easier to close on the stem 34. The hinged side 158 of the skirt 156 is shorter than the swinging side 160 of the skirt 156. This change slightly increases the diameter of the mouth 162 of the skirt 156 from the hinge side 158 to the swinging side 160, without decreasing its diameter in the perpendicular direction, and without changing the diameter of the skirt 156 measured parallel to the lid 154. The increased long diameter of the oval mouth 162 allows it to more easily capture the portion of the lip 52 which is diametrically opposed to the hinge assembly 40 than a round mouth could do. Yet, the skirt 156 remains circular in its cross-sections perpendicular to the axis 164, so the skirt 156 mates with the entire circumference of the stem 34 as in the first embodiment.

Another difference between the closure 150 of FIGS. 7–12 and the closure 30 of FIGS. 1–6 is that the closure 150 lacks an integral sealing membrane 58 and pull ring 62. A separate membrane tape or patch can be applied to the inside of the container 31 to cover the base flange 36. Alternatively, for some purposes the seating relation of the cap 152 and the spout 32 may be sufficiently fluid-tight, particularly with the tamper-evident structure 110 intact, to allow the membrane 58 to be eliminated.

A third embodiment of the invention, generally indicated as 180, is illustrated in FIGS. 13–16. This embodiment has a different tamper-evident structure, here denoted as 110a. The tamper-evident structure 110a is only on one side of the cap 38. This allows for costs savings in material and is easier to fabricate. Also, the cap has a rounded lid as opposed to the beveled lids and flats lids of the other embodiments.

A tamper-evident structure 110 is shown in each of the embodiments of FIGS. 1–16. Referring to FIGS. 1–16, the tamper-evident structure 110 is formed integrally with the cap 38. It should be appreciated, however, that the tamper-evident structure 110 and the cap 38 do not need to be adjacent as molded. The closure 30 could be rearranged to interpose other structure, such as the spout 32, between the tamper-evident structure 110 and the cap 38 as molded. The same is true of other structures identified herein as being "integrally formed", and thus attached directly or indirectly to one another.

In this embodiment, the tamper-evident structure 110 includes a first portion 112, here a tear strip, secured at least substantially directly to the cap 38 (as here) or the spout 32. Here, the tear strip 112 is linked to the cap by a first breakable joint defined by the weakened integral hinge portions 114 and 116. The structure 110 further includes a second portion 118 secured to the tear strip 112 by a second breakable joint 120. As molded, the second portion 118 is movable with respect to the "other one" of the cap 38 and spout 32 not as directly attached to the tear strip 112 (here, the spout 32). Any one of the integral hinges 92, 96, 114, 116, and 120 renders the second portion 118 movable with respect to the spout 32.

The second portion 118 is adapted for being positioned and attached at least substantially in direct contact with the other of the cap 38 and the spout 32 (here, directly to the spout 32) while the cap 38 is sealing the spout 32, in the course of assembling the tamper-evident structure 110.

As one of ordinary skill in the art will appreciate, two elements "substantially in direct contact" or "secured at least substantially directly" or "linked to the cap" as described above are linked more directly than merely being parts of the same one-piece molding (as all the structure in the closure 30 is related to this degree), but may be linked less than directly together with other structure intervening. The limit of a "substantially direct" link of securement is regarded as a wording problem, not a technical problem.

For the present purposes the complete, unopened closure 30 has the requisite substantially direct connection between two elements if they are attached by some structure parallel to the hinge assembly 40, so that if the hinge assembly 40 were severed the two elements in question would still be attached by the parallel structure.

The second portion 118 is attached substantially directly to the base flange 36 of the spout 32, in this embodiment, by inserting the second portion 118 into a complementary recess 122 in the base flange 36. In this embodiment, the recess 122 is diametrically opposed to the recess 98, though this relation is not essential to the invention. In this embodiment the recess 122 has a stud 124 which snaps into an aperture 126 in the second portion 118, to affirmatively locate the second portion 118 in the recess 122. The recess 122 and the second portion 118 could themselves be provided with a snap fit instead, or as well.

When the second portion 118 and recess 122 are permanently joined (which is preferably done at the same time as the closure 30 is secured to a container 31, as described below), the cap 38 is connected by a first breakable joint 114 of 116 to the tear strip 112, which in turn is connected by a second breakable joint 120 to the spout 32. The tear strip 112 is adapted to be torn away and discarded to subsequently release the cap 38 so the closure 30 can be opened.

Even if a tamperer chooses to cut away the stronger second breakable joint 120, leaving the joint 114/116 in place, to obscure the fact that the closure 30 has been opened, it will be evident to the purchaser, when tearing away the strip 112, that it "gives" too easily and therefore the closure has been tampered with. The closure also, here, has a separate membrane seal 58 as a further guard against tampering with the contents of the package bearing the closure 30.

The tear strip 112 has first and second wings or tabs 128 and 130, each of which can include ribs such as 132 so they can be grasped more easily. The tabs 128 and 130 have free top edges 134 and 136 and feet 138 and 140.

When the closure 30 is closed initially, the tear strip 112 is, at or near the same time, swung into its operative position about the breakable joints 114 and 116. The second portion 118 is positioned in the recess 122. The tabs 128 and 130 bear against (and are optionally spread apart a little from their as-molded separation by) the stem 34. The feet 138 and 140 bear against the base flange 36, which tends to urge the second portion 118 into the recess 122. The free top edges 134 and 136 of the tabs 128 and 130 extend above the skirt 44 of the cap 38, so a user can readily push either of the tabs 128 or 138, urging it away from the cap 38 to enable the user to grasp the tab 128 or the tab 130 between the user's thumb and index finger. This affords a secure grip, so the tear strip 112 can be torn away. Two tabs, 128 and 130, are provided in part so that the tear strip 112 can be conveniently torn away with either hand. Right-handed and left-handed people can thus use the closure 30 equally well.

With particular reference to FIGS. 17–22, the integral hinge assembly 40, as molded, includes an L-shaped link 88 having a first portion 90 connected to the flange 36 by an integral hinge 92 and a second portion 94 attached to the cap 38 by an integral hinge 96. The first portion 90 in this embodiment is about as long as the width of the flange 36, at least in the area of the hinge assembly 40. The second portion 94 can be shorter than the height of the stem 34 in the area of the hinge assembly 40.

The first portion 90 is sized and shaped, and the integral hinge 92 is sufficiently flexible, to allow the first portion 90 to be pivoted into, and in this embodiment just fill, the recess 98 in the base flange 36. The second portion 94 elevates the lower margin of the skirt 44 above the base flange 36, thus reducing the necessary height of the skirt 44 and saving material, while reducing the necessary clearance between the inner circumference of the mouth of the skirt 44 and the outer circumference of the lip 52.

The cap 38 includes a pair of integral props 102 and 104 on the respective sides of the hinge assembly 40. When the cap 38 is opened for pouring the contents of a container 31 through the spout 32, the props 102 and 104 are nearly perpendicular to and bear against the stem 34 to keep the cap 38 clear of the emerging contents of the container 31. This is necessary due to the tendency of the cap 38 to partially reseal during pouring due to the effects of gravity and the cap's 38 shape memory as previously explained. The props 102 and 104 preferably maintain the cap 38 at a ninety degree angle to the top of the stem 34. When the cap 38 is closed, the props 102 and 104 sweep down the stem 34 and are stowed against or near the stem 34 and nearly perpendicular to the base flange 36.

As illustrated in FIGS. 17–22, the closures 30, 150 and 180 are formed as a single piece, preferably from a heat sealable thermoplastic material such as polyethylene, by injection molding or the like. The closure 30 may be advantageously molded within a single injection molding tool in its expanded position illustrated in FIG. 17. Such a molding tool is both simple and economical to form.

Additionally, such a tool is easy to maintain. Overall, the single, integral structure shown here gives rise to a closure 30 that is more economical to manufacture than other closures 30 in common use today, such as those comprising separate cap 38 and spout 32 sections. Once the closure 30 is formed, it is folded over. This folding occurs subsequent to removal from a mold and also subsequent to at least partial cooling of the closure 30. As shown in FIG. 19, the cap 38 is completely folded over to engage with the spout 32.

Another feature of the present invention is an orientation peg 142 which projects from the base flange 36 and is eccentrically positioned relative to the center of the closure 30. The peg 142 can be provided by leaving a short column of the material formed in a runner of the mold cavity leading to the underside of the closure 30 when the superfluous material is trimmed from the closure 30.

The orientation peg 142 can be used to orient the closure 30 when it is to be used in a packaging machine. This step is necessary because the closures 30 are conventionally packed in random orientation in a bulk carton, but each closure 30 should face in the same direction when installed on a package.

The assembled and oriented closure 30 is inserted into an aperture of a container 31. Preferably, the closure 30 is inserted to the position shown in FIG. 9 so that the flange 36 engages the interior, thermoplastic surface of the container 31. Alternatively, the flange 36 may engage the exterior, thermoplastic surface of the container 31.

The closure 30 is preferably secured to the container 31 by ultrasonic sealing, heat sealing, pressure sealing, or combinations of these types of sealing mechanisms. Using these types of sealing, the interior thermoplastic layer of the container 31 and the material of the base flange 36 are melted and the interface between them is substantially eliminated (i.e. they are welded) to secure the flange. An ultrasonic sealing horn may be readily configured to surround the cap 38 and stem 34 and engage the area of the exterior of the container 31 about the flange 36 to permanently secure the flange 36 to the container 31.

One particular advantage of the present invention is that the sealing force for permanently assembling the hinge assembly 40 to the base flange 36 can be applied by the mechanism which joins the base flange 36 to the container 31. The ultrasonic, heat, or other energy applied to the flange 36 to seal the flange 36 to the container 31 also heats the first portion 90 of the L-shaped link 88 and the flange walls defining the recess 98, sealing them together. Once this is done, the recesses 98 is full of plastic and thus no longer interrupt the otherwise smooth, generally annular base flange 36.

In the illustrated arrangement, the first portion 90 and the recess 98 are both positioned between the base flange 36 and the inner wall of the container 31 when the assembly is welded together. As a result, most cosmetic imperfections caused by filling the recesses in the base flange are not visible from outside the container 31.

A standard packaging machine may be used to form the closure 30 and seal it to the container 31 with a minimal amount of additional tooling. This is due, at least in part, to the fact that only one sealing tool, for example an ultrasonic sealing tool, is needed to facilitate the sealing. Thus, the overall cost for tooling is reduced, while part production costs and production maintenance is reduced by utilizing a single-piece, low maintenance injection molding tool in the molding process. A further advantage is that the present closure 30 design can be preferably manufactured through a process in which the molding tool is only moved along a single axis running in the mold parting and closing direction.

Alternative, although generally less efficient, processes for securing the closure 30 to the container 31 are also contemplated. For example, adhesives may be used to join the parts of the closure 30, or to attach the closure 30 to a container 31.

FIGS. 23–25 show still another closure, which is a two-piece closure 192 including a cap 194, a spout 196, a flange or shoulder 198, and a tab 200 attached to the cap 194 by a weakened integral hinge 202. In this embodiment, the cap 194 can be a screw cap or a snap-on cap. The spout 196 and flange or shoulder 198 can be parts of an independent closure, as before, or parts integrally molded as parts of a bottle or other container.

Once the cap 194 is snapped or otherwise attached to the spout 196, the tab 200 is secured by ultrasonic, heat, adhesive, or other means to the flange 198. Again, the cap 194 is removed forcefully to break the weakened integral hinge 202, after which the cap 194 can be removed or replaced repeatedly. In this or the preceding embodiment, more than one of the tabs 184 or 200 can be provided about the circumference of the flange such as 198 to form multiple tamper-evident joints.

The present closures can be molded in one shot, as a single part, in one two-part mold which does not require laterally traveling mold elements.

A simple folding step can be employed to position the cap, the spout, and the tamper-evident tear strip from their as-molded positions to their closed positions, without requiring "tacking" or other heating operations. The closure can be snapped shut reasonably securely, without gluing or welding its parts together, so it will remain closed during handling and can easily be inserted cleanly through a small aperture in a container.

An orientation peg, optionally formed as a vestige of the plastic remaining in a mold runner, can be provided to cause the closure to self orient with its hinged side trailing when sliding down an incline. The orientation ability of the inclined surface may be accentuated by roughening the surface of the incline.

The closure can have a pull ring for breaking and removing a sealing membrane within the spout. The pull ring can be positioned with its free side projecting above the rim of the spout at one point in the spout circumference. The pull ring can be contacted on the outside with a finger and pushed further up to permit it to be grabbed. If molded polyethylene (which provides heat-sealability to polyethylene coated board but little resilience), the cap can be vaulted to provide interior room for accommodating the raised part of the pull ring.

The vaulted cap of the closure can be provided in an aesthetically pleasing configuration which still has a relatively low profile. The low profile configuration can also have functional features, such as a front raised surface which extends vertically from a slanted panel of a gable top container so it will not project through the plane of any of the side panels of the container.

The cap can have one or more molded-in legs extending from the cap near the hinge. The legs will erect against the outside of the spout 32 when the cap 38 is opened to hold the cap 38 out of the way of the spout 32. These legs can fold against the spout 32 when the cap 38 is closed. This allows the closure 30 to be molded of easily sealed polyethylene, which has no memory and inelastically deforms during storage.

The tear strip of the tamper-evident structure can be bifurcated by providing a separate pull tab on each of its ends so the closure can be opened equally well by left or right-handed people.

The tear strip can be molded half-round and out of position so its tabs fit snugly against the cap when folded into position. This feature prevents the tear strip from catching in the aperture through the wall of the container during assembly.

The top edges of the tabs extend above the top of the skirt of the cap. Each of the top edges is easy to push away from the cap so one of the tabs can be securely grasped to tear away the tear strip and open the closure. The feet of the tear strip contact the base flange of the closure when the tear strip is folded into place and the closure is closed. This contact rotates the tear strip, tending to urge the second portion of the tamper-evident structure into a recess in the base flange.

The closures can be easily assembled to their closed positions, and their parts and appendages can stay in their closed positions during further handling without requiring any welding operations or the like. The sealing operations necessary to provide a closure durable enough for use can be carried out at the same time the closure is joined to a container wall, using the same ultrasonic tool or other energy source, fastener, or adhesive used to attach the closure to an inside wall of the container. This expedient saves a manufacturing step and avoids deformation of the closure which could be caused by a plastic welding operation carried out on the closure before installing the closure in a container.

The flat cap alternatively provided in the closure can have an exceedingly low profile. The swinging side of the skirt of the closure can be deeper than the hinged side of the skirt. This configuration allows the mouth of the cap to reach slightly further to capture the fee side of the lip of the stem.

There is illustrated in FIG. 26 a flow diagram of the method of producing the closure of the present invention. As shown in FIG. 26, at step 400 a mold is provided for a closure. The mold may be on a injection molding machine which may also have additional molds with a preferred number being 64 molds. At step 402, the mold is filled with a polymeric material to be formed into an integral one-piece closure. A preferred polymeric material is polyethylene, however, other polymeric materials may be used in fabricating the closure. At step 404 the mold is opened and a means of conveyance is provided to conveyor the closure from the molding machine to a folding machine. The conveyance means may be flat arm having partitioned areas for receiving a closure. At step 406, the closure is attached to the conveyance means. This may occur through pushing of the closure out from the mold by means of a pin. The conveyance means may also have a vacuum for receiving the closure.

At step 408, the closure is conveyed to an adjacent folding machine. At step 410, the closure is delivered from the conveyance means to a reorienting means. The closure is placed on the reorienting means with the bottom of the spout and the top of the cap facing outward in an unfoldable orientation. The orientation is unfoldable in that the hinge assembly would be broken if folded, and the spout would not be covered as desired. The reorientation means may be a flat sheet having a groove with or without a vacuum for accepting the closure. At 412, the reorientation means moves and attaches the closure to a folding device thereby reorienting the closure to a foldable orientation with the bottom of the spout and the top of the cap facing inward. At step 414, the cap is folded onto the spout by the folding device. The folding device may operate similar to a door hinge in folding the cap onto the spout. At 416, the closure is released from the folding device onto a conveyor mechanism disposed below for packaging and distribution.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes, modifications and substitutions of equivalents may be made therein without departing from the spirit and scope of this invention which is intended to be unlimited by the foregoing except as may appear in the following appended claims. Therefore, the embodiments of the invention in which an exclusive property or privilege is claimed are defined in the following appended claims.

We claim as our invention:

1. A closure for a container, the closure having a forward end and a rearward end, the closure comprising:

a spout having a substantially flat flange and an annular stem projecting therefrom, the annular stem defining an aperture, the flange having a top surface and a bottom surface, the annular stem projecting substantially perpendicular from the top surface of the flange a predetermined length and defining a predetermined circumference, the annular stem having an exterior side and an interior side;

a cap having a lid and an annular skirt projecting therefrom, the annular skirt having a circumference greater than the predetermined circumference of the annular stem, the skirt having at least one prop projecting therefrom, the at least one prop extending toward the flange when the cap is in the closed position and the bottom of the at least one prop engaged with the exterior side of the stem, the lid angled upward toward the forward end of the closure, the cap also having a beveled edge juxtaposed to the lid and annular skirt, the beveled edge having its greater length between the lid and the annular skirt at the forward end of the closure and diminishing toward the rearward end of the closure;

a membrane covering the aperture and removeably connected to the interior surface of the stem, the membrane connected to a post at one end of the post, the post connected to a ring at another end, the ring angled substantial parallel to the angle of the lid;

a hinge assembly connecting the cap to the spout, the hinge allowing for the reclosable opening of the cap from the spout while maintaining the attachment of the cap with the spout; and a tamper-evident structure formed integrally with the cap including a removable portion secured to one of the cap and the spout by a breakable joint;

whereby the tamper-evident structure must be displaced to access the contents of the container.

2. The closure according claim 1 further comprising an orienting peg disposed on the closure to properly orient the closure for placement on a container.

* * * * *